(12) United States Patent
Bihari et al.

(10) Patent No.: US 9,017,800 B2
(45) Date of Patent: Apr. 28, 2015

(54) POLYOXYMETHYLENE WITH IMPROVED PRINTABILITY

(71) Applicant: Ticona LLC, Florence, KY (US)

(72) Inventors: Malvika Bihari, Florence, KY (US); Robert Gronner, Erlanger, KY (US); Lowell Larson, Independence, KY (US); Jeremy Hager Klug, Union, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/060,658

(22) Filed: Oct. 23, 2013

(65) Prior Publication Data

US 2014/0127481 A1    May 8, 2014

Related U.S. Application Data

(60) Provisional application No. 61/723,819, filed on Nov. 8, 2012.

(51) Int. Cl.
| | |
|---|---|
| *B32B 3/02* | (2006.01) |
| *C08J 5/04* | (2006.01) |
| *A44B 11/00* | (2006.01) |
| *C08L 59/04* | (2006.01) |
| *C08L 71/02* | (2006.01) |

(52) U.S. Cl.
CPC ............. *C08J 5/043* (2013.01); *A44B 11/00* (2013.01); *C08L 59/04* (2013.01); *C08L 71/02* (2013.01)

(58) Field of Classification Search
CPC ................................ C08L 59/04; C08L 71/02
USPC .................................... 428/195.1, 207, 323.1
See application file for complete search history.

(56) References Cited

U.S. PATENT DOCUMENTS

| | | | |
|---|---|---|---|
| 4,795,477 A | 1/1989 | Kusumgar et al. | |
| 5,767,205 A | 6/1998 | Mutsuda et al. | |
| 5,837,744 A * | 11/1998 | Nagashima et al. | 522/4 |
| 2012/0157588 A1 * | 6/2012 | Markgraf et al. | 524/101 |
| 2013/0171430 A1 * | 7/2013 | Bihari et al. | 428/195.1 |

FOREIGN PATENT DOCUMENTS

| | | | |
|---|---|---|---|
| EP | 2441786 A1 | 4/2012 | |
| WO | WO 2012049293 A1 | 4/2012 | |

OTHER PUBLICATIONS

Abstract of WO Patent—WO 2006105918, Oct. 12, 2006, 1 page.

* cited by examiner

*Primary Examiner* — Elizabeth Mulvaney
(74) *Attorney, Agent, or Firm* — Dority & Manning, P.A.

(57) ABSTRACT

Polymer compositions containing a polyoxymethylene polymer are disclosed that are receptive to paints and ink coatings. The polymer composition contains a polyoxymethylene polymer having a relatively high functional group content in combination with a coupling agent, a texturizing agent, and optionally a thermoplastic elastomer. The polymer composition can be molded into various articles at a mold temperature less than about 125° C., such as from about 60° C. to about 120° C. and then painted or printed with an ink composition. The polymer composition has been found to dramatically improve adhesion between the molded article and the ink or paint coating.

27 Claims, 7 Drawing Sheets

US 9,017,800 B2

POLYOXYMETHYLENE WITH IMPROVED PRINTABILITY

RELATED APPLICATIONS

The present application claims priority to U.S. Provisional Application Ser. No. 61/723,819, filed on Nov. 8, 2012, which is incorporated herein in its entirety by reference thereto.

BACKGROUND OF THE INVENTION

Polyacetal polymers, which are commonly referred to as polyoxymethylene polymers, have become established as exceptionally useful engineering materials in a variety of applications. Polyoxymethylene polymers, for instance, are widely used in constructing molded parts, such as parts for use in the automotive industry and the electrical industry. Polyoxymethylene polymers have excellent mechanical properties, fatigue resistance, abrasion resistance, chemical resistance, and moldability.

Although polyoxymethylene polymers have excellent physical characteristics, the polymers are typically not amenable to many printing or painting processes. For instance, due to a low surface energy and high crystallinity, polyoxymethylene polymers are not receptive to many paints and printing inks. Printing inks, for instance, do not sufficiently adhere to the surface of the polymer for many applications. While attempts have been made to pretreat the surface of the polymer to improve ink adhesion, such as corona discharge, UV irradiation, or e-beam irradiation, followed by printing with UV curable inks, this requires additional time and is an added expense in the manufacturing of articles molded from polyoxymethylene polymers.

In view of the above, a need exists for a polyoxymethylene polymer composition and to a process for molding polyoxymethylene articles that have greater affinity and adhesion to paints and inks without the need for pretreating the polymer surface.

SUMMARY OF THE INVENTION

In general, the present disclosure is directed to a polymer composition containing a polyoxymethylene polymer that is well suited to receiving and adhering to an ink composition. The polyoxymethylene polymer composition can be formed into an article through any suitable molding process, such as injection molding or blow molding. Once the article is produced, the article can then be subjected to a printing process, such as a pad printing process, in which an ink composition is applied to an exterior surface of the article. Of particular advantage, the ink composition can be directly applied to the surface of the article without having to apply a primer or otherwise pretreat the surface. As will be described in greater detail below, it was discovered that the polymer composition of the present disclosure exhibits excellent adhesion to ink compositions as demonstrated when subjected to adhesion tests, such as the cross hatch tape pull test according to ISO Test 2409 or ASTM Test D3359 and the Taber test.

In one embodiment, for instance, the present disclosure is directed to a molded article made from a polymer composition. The polymer composition comprises a polyoxymethylene polymer blended with a texturizing agent. More particularly, a polyoxymethylene polymer is selected for use in the composition wherein at least about 25%, such as at least about 50%, such as at least about 60%, such as at least about 70%, such as at least about 80% of the terminal groups on the polyoxymethylene polymer are functional groups. In one embodiment, the functional groups may comprise hydroxyl groups. The hydroxyl groups may comprise, for instance, hydroxyethylene groups and/or hydroxyl side groups. In one embodiment, the article is molded using a mold temperature less than about 125° C.

The molded article further includes a coating applied to the exterior surface of the article. The coating comprises an ink composition and can be continuous or discontinuous over the surface of the molded article. In one embodiment, for instance, the coating has been pad printed onto the exterior surface of the molded article. The coating may comprise, for instance, printed matter, designs, or the like. The ink composition can comprise a polymer resin combined with at least one coloring agent. The resin may comprise a cross-linked polymer, such as a polyvinyl alcohol, an epoxy, an acrylic, an acrylate, an acrylated urethane, a polyester, or a polyether. The coloring agent, on the other hand, may comprise an organic or inorganic pigment, an organic or inorganic dye, or mixtures thereof.

The polymer composition as described above contains a polyoxymethylene polymer blended with a texturizing agent. The polyoxymethylene polymer may be present in the polymer composition in an amount ranging from about 50% by weight to about 99% by weight. The texturizing agent may be present in the polymer composition in an amount ranging from about 3% by weight to about 50% by weight. The texturizing agent may comprise particles, fibers or combinations thereof. For instance, the texturizing agent may comprise glass fibers. Further, in one embodiment, a sizing agent may be coated onto the texturizing agent. Meanwhile, the polymer composition further comprises a coupling agent for coupling the texturizing agent to the polyoxymethylene polymer. The coupling agent, for instance, may comprise an isocyanate. The coupling agent may be present in the polymer composition in an amount ranging from about 0.1% by weight to about 10% by weight.

In still another embodiment, a thermoplastic elastomer may also be contained in the polymer composition. The thermoplastic elastomer may comprise a thermoplastic polyurethane elastomer. The thermoplastic elastomer may be present in the polymer composition in an amount ranging from about 5% by weight to about 50% by weight.

Of particular advantage, the polymer composition of the present disclosure including a polyoxymethylene polymer blended with a texturizing agent is capable of receiving an ink composition without having to pretreat the surface of the molded article. Thus, in one embodiment, the ink composition is applied directly to an exterior surface of the molded article. Further, the ink composition can be applied to an exterior surface of the molded article without any pretreatment.

The coating applied to the exterior surface of the molded article may be a single color or may comprise a plurality of colors. Molded articles made according to the present disclosure may be used in numerous different fields. For instance, the molded product may comprise a medical device, military gear, such as a buckle having a camouflage pattern, an automotive part, a consumer appliance part, a sporting good, or the like.

Other features and aspects of the present disclosure are discussed in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
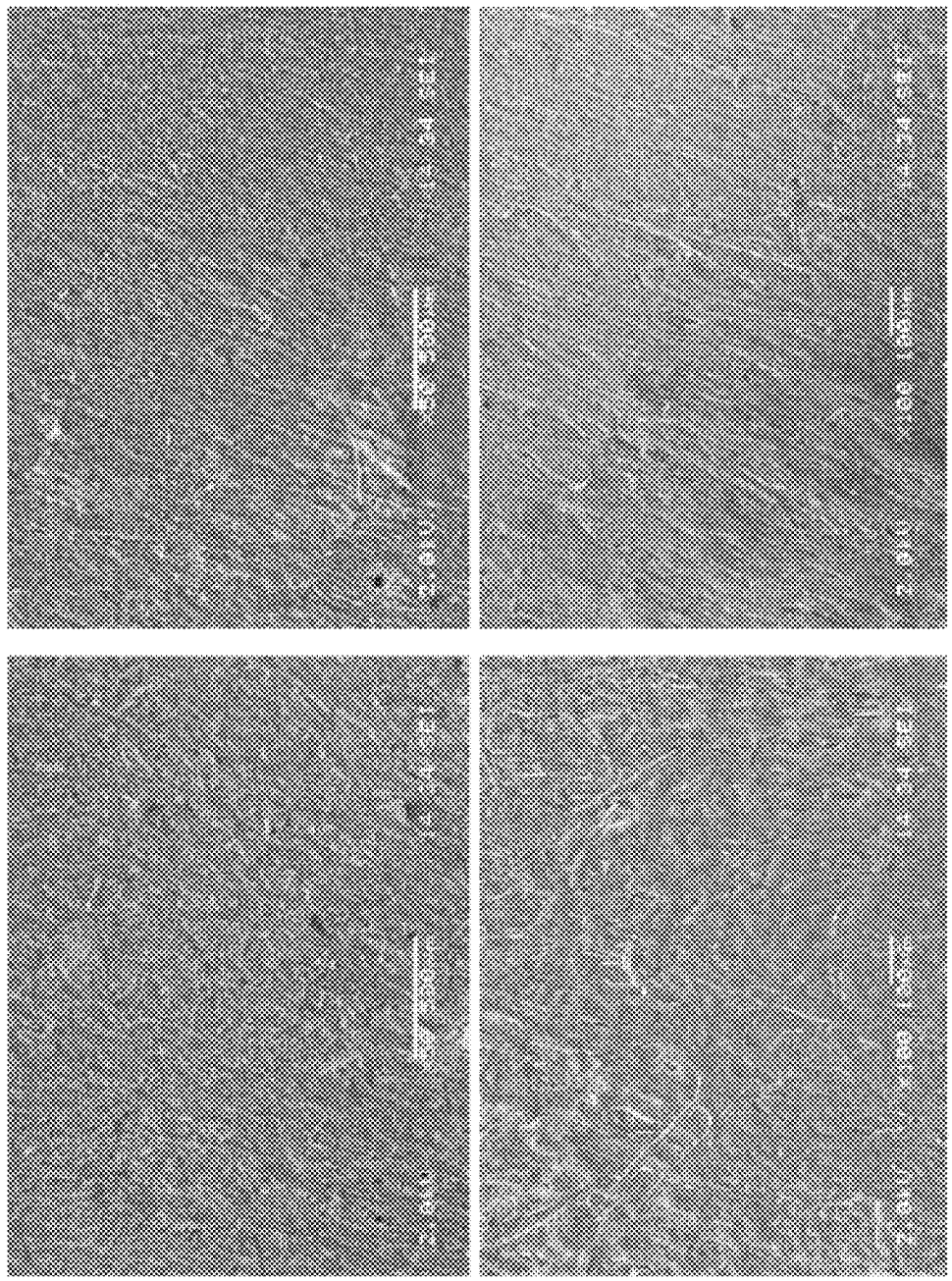
FIG. 1 represents a series of scanning electron micrographs (SEMs) showing the surface roughness of a plaque molded from a polymer composition according to one embodiment of the present disclosure.
Figure 2:
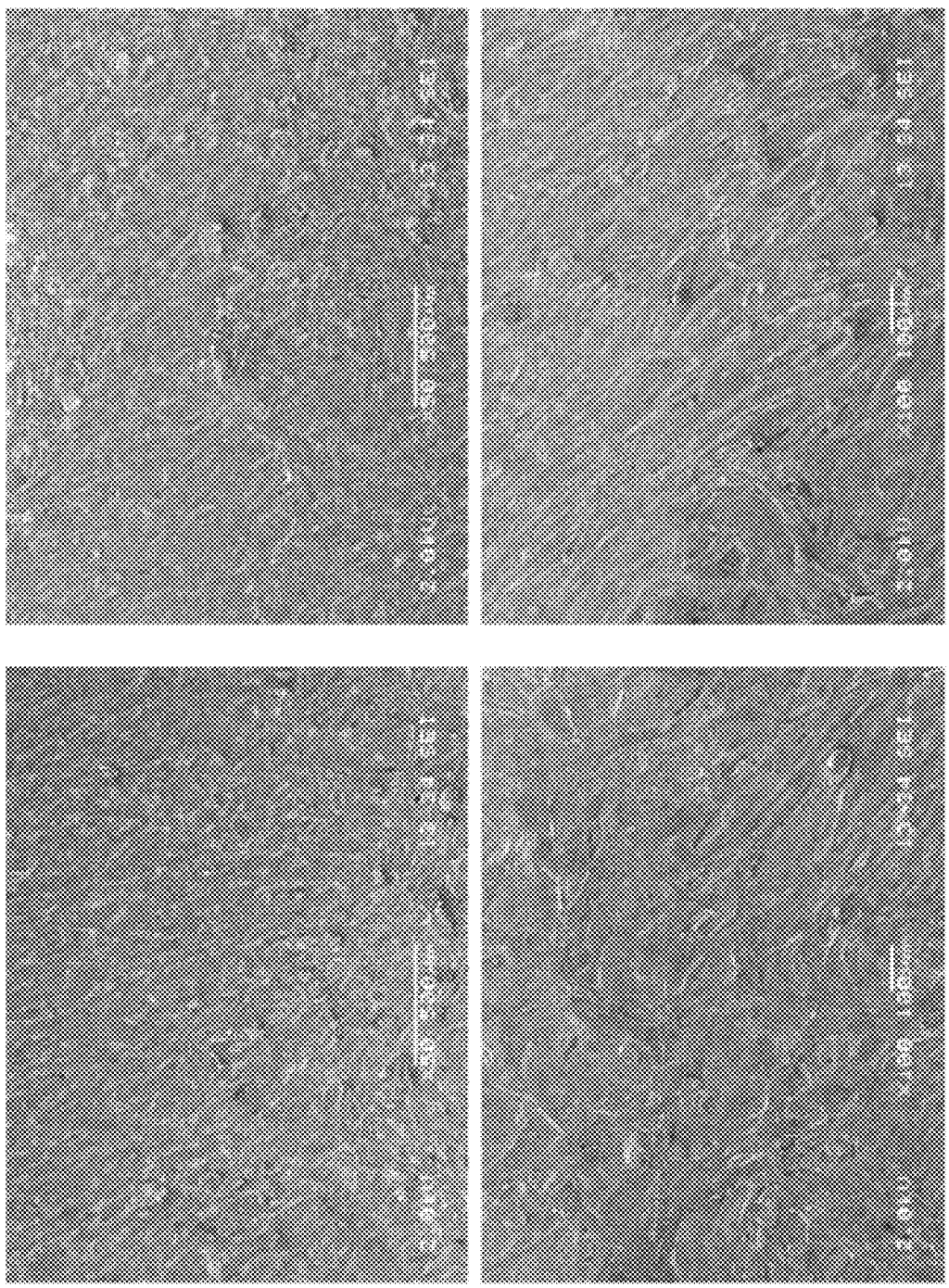
FIG. 2 represents a series of SEMs showing the surface roughness of plaque molded from a polymer composition according to another embodiment of the present disclosure.
Figure 3:
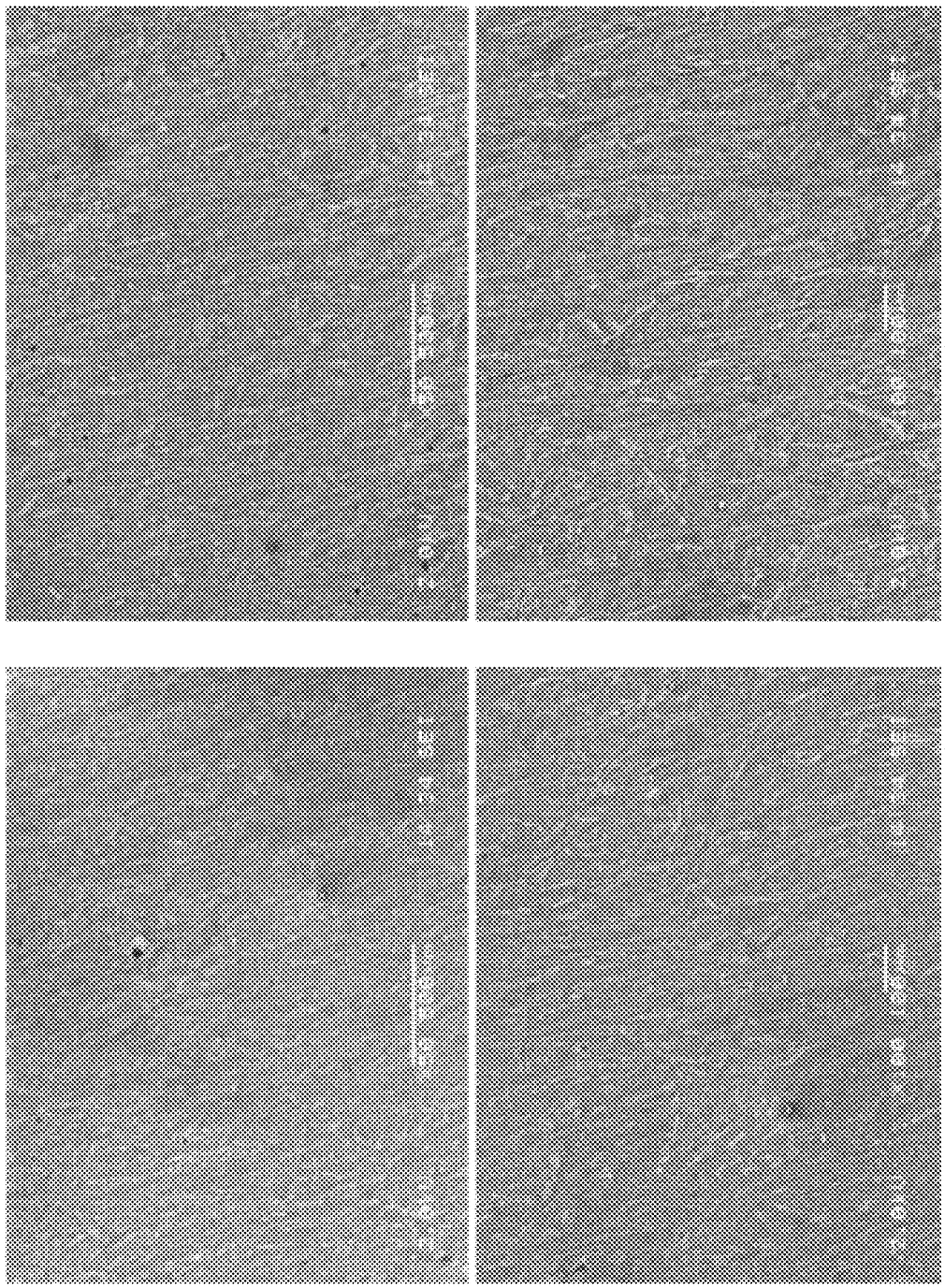
FIG. 3 represents a series of SEMs showing the surface roughness of a plaque molded from a polymer composition according to still another embodiment of the present disclosure.
Figure 4:
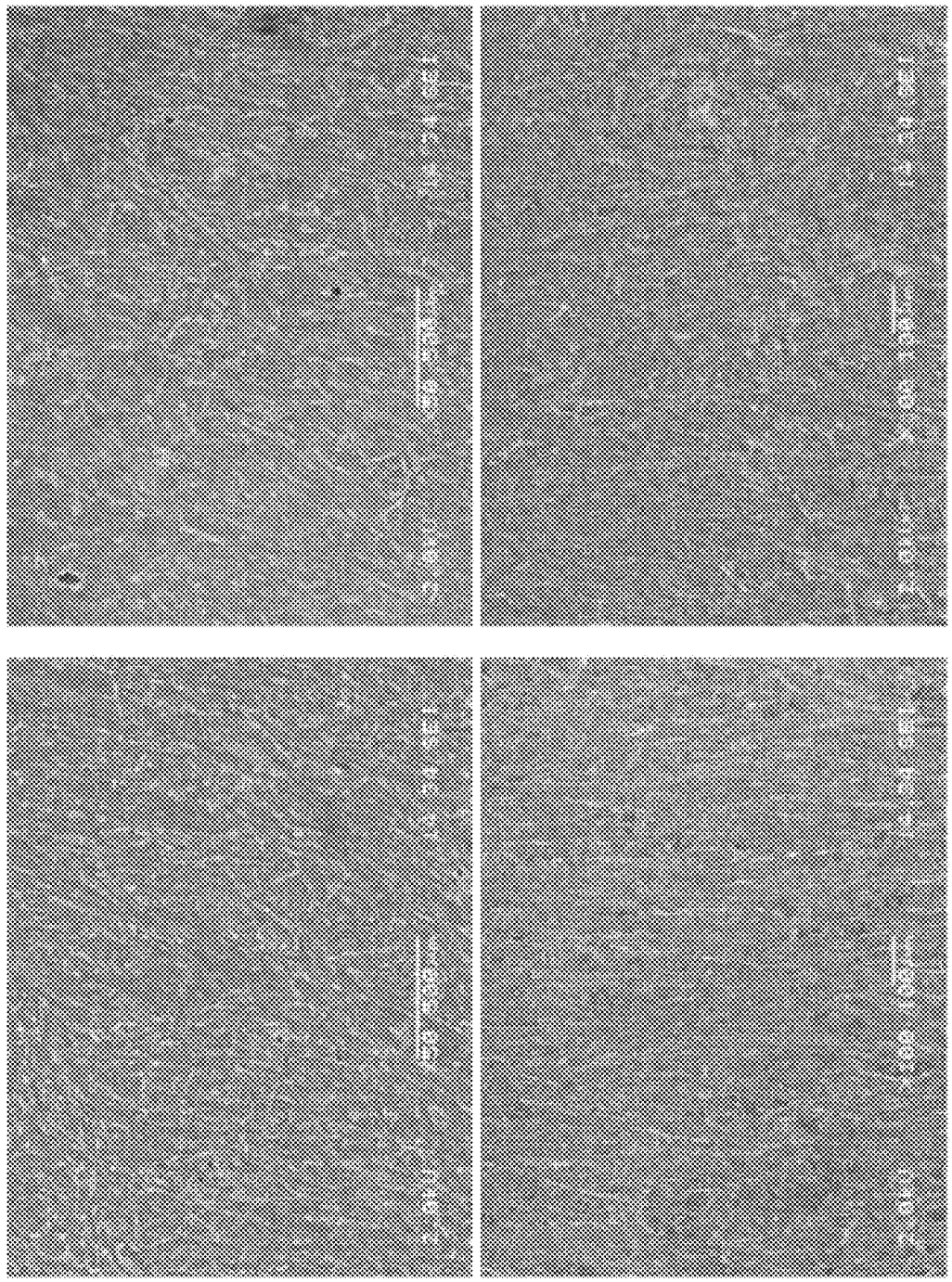
FIG. 4 represents a series of SEMs showing the surface roughness of a plaque molded from a polymer composition according to yet another embodiment of the present disclosure.

It is to be understood by one of ordinary skill in the art that the present discussion is a description of exemplary embodiments only, and is not intended as limiting the broader aspects of the present disclosure.

In general, the present disclosure is directed to a polyacetal composition that is well suited to being molded into a particular shape and then coated with an ink composition. The present disclosure is also directed to a process for producing molded parts containing a polyoxymethylene polymer and then applying a paint or ink composition to a surface of the molded part. More particularly, the present disclosure is directed to a polymer composition containing a polyoxymethylene polymer that is formulated so as to increase adhesion between various ink compositions and the surface of a molded article made from the polymer composition. In one embodiment, for instance, the ink composition can be applied to the molded article in a printing process.

In the past, various significant challenges have been faced by those skilled in the art attempting to decorate molded articles made from a polyoxymethylene polymer by printing or painting. Polyoxymethylene polymers, for instance, typically do not adhere well to printing inks. Thus, once printed with an ink, the design, color or decoration printed on the molded article had a tendency to wear off prematurely and not be scratch resistant. Consequently, the use of molded articles made from polyoxymethylene polymers has been limited, especially in applications where there is a desire to apply designs and/or printed matter to the article.

The present disclosure is directed to a polymer composition containing a polyoxymethylene polymer that has dramatically improved receptive and adhesion properties to decorative surface coatings, such as ink compositions. In general, the polymer composition comprises a combination of a polyoxymethylene polymer having a relatively high number of functional groups combined with a texturizing agent. The composition can further comprise a thermoplastic elastomer. The combination of a functional polyoxymethylene polymer with a texturizing agent has been found to unexpectedly improve adhesion to decorative coatings, thus not only improving wear but also improving scratch resistance.

As described above, the polyoxymethylene polymer contained in the polymer composition has a relatively high number of functional groups. For instance, least about 25%, such as at least about 50%, such as at least about 60%, such as at least about 70%, such as at least about 80% of the terminal groups on the polyoxymethylene polymer are functional groups.

In one embodiment, for instance, the polyoxymethylene polymer includes a significant number of hydroxyl groups in the terminal position. For instance, in one embodiment, ether end groups on the polyoxymethylene polymer can be replaced with ethoxy hydroxy end groups. The hydroxyl group content of the polyoxymethylene polymer can be further increased by using a comonomer with hydroxyl side chains. The hydroxyl group concentration may also be increased through the use of a polyoxymethylene moiety with a dendrimer structure. The polyoxymethylene polymer can include more than 20 hydroxyl groups per chain, such as more than 25 hydroxyl groups per chain. In one embodiment, for instance, the polyoxymethylene polymer may include from about 20 hydroxyl groups per chain to about 50 hydroxyl groups per chain.

More particularly, the polyoxymethylene polymer can have terminal hydroxyl groups, for example, hydroxyethylene groups and/or hydroxyl side groups in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. In another embodiment, the polyoxymethylene polymer can have other terminal groups, such as alkoxy groups, formate groups, acetate groups, or aldehyde groups. It should be understood that the total number of terminal groups present includes all side terminal groups.

As described above, the polymer composition further comprises a texturizing agent. The texturizing agent may be present in the polymer composition in an amount ranging from about 3% by weight to about 50% by weight. The texturizing agent may comprise particles, fibers or combinations thereof as discussed in more detail below. For instance, the texturizing agent may comprise glass fibers. Further, in one embodiment, a sizing agent may be coated onto the texturizing agent. Meanwhile, the polymer composition further comprises a coupling agent for coupling the texturizing agent to the polyoxymethylene polymer. The coupling agent, for instance, may comprise an isocyanate. The coupling agent may be present in the polymer composition in an amount ranging from about 0.1% by weight to about 10% by weight.

As described above, the polymer composition may further comprise a thermoplastic elastomer. The thermoplastic elastomer may comprise, for instance, a thermoplastic polyurethane elastomer and/or a polyester elastomer. The thermoplastic elastomer is present in the composition in an amount greater than about 5% by weight, such as in an amount greater than 10% by weight, such as in an amount greater than about 15% by weight, up to an amount of about 50% by weight. The thermoplastic elastomer may be chemically bonded to the polyoxymethylene polymer, such as by the coupling agent.

As described above, the polymer composition dramatically improves adhesion to decorative coatings. Of particular advantage, molded articles made from the polymer composition described above are well suited for use in pad printing processes. In a pad printing process, a discontinuous coating or a continuous coating can be applied to a three-dimensional object using a rubber pad that is typically made from a silicone. During pad printing, an image is transferred from a printing plate onto the rubber pad. The rubber pad then contacts the molded article for printing a design on the molded article. Pad printing is particularly well suited to transferring an ink composition to a non-flat surface. The ink composition may be transferred to the molded article in order to change the color of the article, print a design onto the article, and/or to transfer printed matter onto the article. For instance, the image can be transferred from the rubber pad to cylindrical surfaces, spherical surfaces, textured surfaces, concave surfaces, convex surfaces, and generally to any surface that has a three-dimensional configuration.

In addition to pad printing processes, molded articles made according to the present disclosure may also be printed using other techniques. For instance, the molded articles are also well suited for use in inkjet printing processes, flexographic printing processes, painting processes, and the like.

The ink composition applied to molded articles in accordance with the present disclosure can vary depending upon the particular application, the particular printing process and the desired result. In one embodiment, the ink composition may contain a coloring agent, a polymer resin, a solvent, and optionally an initiator and/or a crosslinking agent. Once the ink composition is applied to molded articles in accordance with the present disclosure, the ink composition can be dried or cured through the application of heat, ultraviolet light, electron beam radiation, or the like.

The coloring agent contained in the ink composition may comprise a dye, a pigment, or mixtures thereof. Dyes are coloring agents that are soluble in a solvent, are translucent, and typically absorb but do not scatter light. Pigments, on the other hand, typically refer to opaque coloring agents that are insoluble. Pigments can be made from organic compounds or from inorganic compounds.

Pigments that may be present in the ink composition can vary without limitation. Pigments that may be used, for instance, include carbon black, iron oxides, including iron oxide black, red lake pigment, quinacrydone pigments, and the like. Other pigments include phthalocyanine blue, cobalt blue, phthalocyanine green, chromium sesquioxide, carbazole violet, and the like. Titanium dioxide, calcium carbonate, magnesium oxide, talc and barium sulfate may also be used as a pigment and/or an opacifier. The ink composition can contain a single pigment or can contain a plurality of pigments. For instance, any suitable color can be created by mixing two or more pigment colors together to achieve a desired shade.

In general, an ink composition can contain one or more coloring agents in an amount from about 1% to about 60% by weight, such as in an amount from about 2% to about 20% by weight.

In addition to one or more coloring agents, the ink composition can contain a polymer resin. In one embodiment, the polymer resin comprises a resin that becomes crosslinked when the ink composition is dried or cured.

The polymer resin present in the ink composition may comprise an oligomer. Examples of polymer resins that may be used include epoxies, acrylics, acrylated urethanes, acrylates including methacrylates, polyesters, polyethers, polyvinyl alcohols, and the like. The ink composition may contain a single polymer resin or may contain a blend of resins. One or more polymer resins may be contained in the ink composition in an amount from about 10% to about 90% by weight, such as in an amount from about 20% to about 80% by weight.

As described above, the ink composition can contain a solvent which may comprise water. Other solvents may comprise organic or inorganic solvents. Exemplary solvents include, without limitation, acetone, alcohols (e.g., methanol, ethanol, propanol, isopropanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

The solvent may also be a mixture of several organic solvents or a mixture of water and one or more water soluble or water miscible organic components, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof.

The ink composition may also contain an initiator and/or a crosslinking agent. An initiator may be present, for instance, if the ink composition is ultraviolet light curable. Initiators that may be used include peroxides or nitriles. In one embodiment, a wetting agent including surfactants may also be contained in the ink composition.

Various commercially available ink compositions may be used for applying to molded articles made in accordance with the present disclosure. For instance, in one embodiment, the ink composition may be obtained commercially from ITW Trans Tech of Carol Stream, Ill. Ink compositions particularly well suited for use in application to molded articles in accordance with the present disclosure include printing ink type B, printing ink type B/GL, printing ink type PV, printing ink type R or printing ink type W, which are all available from the above supplier.

As described above, in one embodiment, a pad printing process may be used for applying the ink composition to the molded article. During pad printing, a deformable pad is used to apply the ink composition to an exterior surface of the molded article. In one embodiment, the ink composition is applied to a printing plate for transfer to a print pad. In an alternative embodiment, an inkjet head may be used to deposit the ink composition onto a deformable pad. The pad is then forcibly deformed while being brought into contact with the molded article. The image then transfers to the molded article and the ink composition is dried and/or cured.

As described above, the polymer composition of the present disclosure generally contains a polyoxymethylene polymer having a relatively high amount of functional groups, such as hydroxyl groups, combined with a texturizing agent.

The preparation of the polyoxymethylene can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted. The above-described procedure for the polymerization can lead to polymers having comparatively small proportions of low molecular weight constituents. If a further reduction in the content of low molecular weight constituents were to be desired, this can be effected by separating off the low molecular weight fractions of the polymer after the deactivation and the degradation of the unstable fractions after treatment with a basic protic solvent. This may be a fractional precipitation from a solution of the stabilized polymer; polymer fractions of different molecular weight distribution being obtained.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2% by weight.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

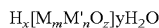

$$H_x[M_mM'_nO_z]yH_2O$$

wherein
M represents an element selected from the group consisting of P, Si, Ge, Sn, As, Sb, U, Mn, Re, Cu, Ni, Ti, Co, Fe, Cr, Th or Ce,
M' represents an element selected from the group consisting of W, Mo, V or Nb,
m is 1 to 10,
n is 6 to 40,
z is 10 to 100,
x is an integer of 1 or above, and
y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

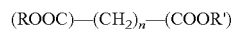

(ROOC)—(CH$_2$)$_n$—(COOR')

wherein
n is an integer from 2 to 12, preferably 3 to 6, and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

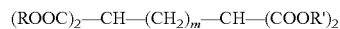

(ROOC)$_2$—CH—(CH$_2$)$_m$—CH—(COOR')$_2$ wherein
m is an integer from 0 to 10, preferably from 2 to 4, and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

In some embodiments, the polymer composition of the present disclosure may contain other polyoxymethylene homopolymers and/or polyoxymethylene copolymers. Such polymers, for instance, are generally unbranched linear polymers which contain as a rule at least 80%, such as at least 90%, oxymethylene units. Such conventional polyoxymethylenes may be present in the composition as long as the resulting mixture maintains the above amounts of hydroxyl terminated groups and the above amounts of low molecular weight constituents.

In one embodiment, the polyoxymethylene polymer has a content of terminal hydroxyl groups of at least 5 mmol/kg, such as at least 10 mmol/kg, such as at least 15 mmol/kg. In one embodiment, the terminal hydroxyl group content ranges from 18 to 50 mmol/kg.

As discussed above, in addition to the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —CH$_2$O-repeat units.

In addition to having a relatively high terminal hydroxyl group content, the polyoxymethylene polymer according to the present disclosure may have a relatively low amount of low molecular weight constituents. As used herein, low molecular weight constituents (or fractions) refer to constituents having molecular weights below 10,000 dalton. For example, the polyoxymethylene polymer can contain low molecular weight constituents in an amount less than about 15% by weight, based on the total weight of the polyoxymethylene. In certain embodiments, for instance, the polyoxymethylene polymer may contain low molecular weight constituents in an amount less than about 10% by weight, such as less than about 5% by weight, such as in an amount less than about 3% by weight, such as even in an amount less than about 2% by weight.

The polyoxymethylene polymer present in the composition can generally have a melt volume rate (MVR) of less than 50 cm$^3$/10 min, such as from about 1 to about 40 cm$^3$/10 min, such as from about 2 to 20 cm$^3$/10 min determined according to ISO 1133 at 190° C. and 2.16 kg.

It is to be understood that the term polyoxymethylene comprises both homopolymers of formaldehyde or its cyclic oligomers, such as trioxane or 1,3,5,7-tetraoxacyclooctane, and corresponding copolymers. For example the following components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, functionalized polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used as polyoxymethylene.

Such polyoxymethylene homo- or copolymers are known per se to the person skilled in the art and are described in the literature.

The amount of polyoxymethylene polymer present in the polymer composition of the present disclosure can vary depending upon the particular application. In one embodiment, for instance, the composition contains polyoxymethylene polymer in an amount of at least 50% by weight, such as in an amount greater than about 55% by weight, such as in an amount greater than about 60% by weight, such as in an amount greater than about 65% by weight. In general, the polyoxymethylene polymer is present in the composition in an amount less than about 99% by weight, such as in an amount less than about 95% by weight, such as in an amount less than about 90% by weight.

A coupling agent may be added to the composition to provide a linkage between the polyoxymethylene and other components that may be present in the composition, such as the texturizing agent and the thermoplastic elastomer. In principle any coupling agent which is capable to react with nucleophilic groups such as —OH or —NH$_2$ can be used.

For instance, the coupling agent can improve the compatibility of the texturizing agent with the polymer matrix. A suitable coupling agent is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

A wide range of polyfunctional, such as trifunctional or bifunctional coupling agents, may be used. In one embodiment, the coupling agent comprises a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanatomethyl-3,5,5-trimethylcyclo-hexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

The polymer composition generally contains the coupling agent in an amount from about 0.1% to about 10% by weight. In one embodiment, for instance, the coupling agent is present in an amount greater than about 1% by weight, such as in an amount greater than 2% by weight. In one particular embodiment, the coupling agent is present in an amount from about 0.2% to about 5% by weight. To ensure that the thermoplastic elastomer has been completely coupled to the polyoxymethylene polymer, in one embodiment, the coupling agent can be added to the polymer composition in molar excess amounts when comparing the reactive groups on the coupling agent with the amount of terminal hydroxyl groups on the polyoxymethylene polymer.

The polymer composition further comprises a texturizing agent. The texturizing agent can include particles, fibers, or combinations thereof. Texturizing agents that may be included in the composition include glass beads, wollastonite, loam, molybdenum disulfide or graphite, inorganic or organic fibers such as mineral fibers such as glass fibers, carbon fibers, polymer fibers, aramid fibers, metal fibers such as steel fibers, carbon fibers, natural fibers, fibers from renewable sources, or combinations thereof. The glass fibers, for instance, may have a length of greater than about 3 mm, such as from 5 to about 50 mm.

The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates. These texturizing agents may be in modified or unmodified form, e.g., provided with a sizing, or chemically treated, in order to improve adhesion to the plastic.

In one particular embodiment, the texturizing agent can be glass fibers. The glass fibers can further be provided with a sizing agent to protect the glass fiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g., 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino) propyltrimethoxysilane, N-[3-(trimethoxysilyl)propyl]-1,2-ethane-diamine. Meanwhile, film forming agents are for example polyvinylacetates, polyesters and polyurethanes.

The texturizing agent may be compounded into the polyoxymethylene matrix, for example in an extruder or kneader. Additionally, the texturizing agent may also y take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to another embodiment of the present disclosure, the polymer composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the texturizing agent can also be impregnated with the polyacetal matrix polymer. Further, if a thermoplastic elastomer is blended with the polyoxymethylene polymer, the texturizing agent can be added after the poloxymethylene polymer is compounded with the thermoplastic elastomer via, for example, melt extrusion processes.

According to another embodiment, the polymer composition of the present invention comprises at least one texturizing agent which is a mineral fiber, such as a glass fiber, such as a coated or impregnated glass fiber. Glass fibers which are suitable for the polymer composition of the present invention are commercially available (e.g., THERMOFLOW® Chopped Strand 753 available from Johns Manville, OCV™ Chopped Strand 408 A, Nippon Electric Glass Co. (NEG) Chopped Strand T-651).

Regardless of the manner in which it is incorporated into the polymer composition, the texturizing agent can be present in the polymer composition of the present disclosure in an amount from about 3% by weight to about 50% by weight, such as from about 4% by weight to about 40% by weight, such as from about 5% by weight to 30% by weight, wherein the weight is based on the total weight of the composition.

In another embodiment of the present disclosure, any suitable thermoplastic elastomer may be combined with the polyoxymethylene polymer and texturizing agent to form one embodiment of the polymer composition of the present disclosure.

Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with coupling reagents and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one particular embodiment, a thermoplastic polyurethane elastomer is used. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as poly (butylene adipate)diol, poly(ethylene adipate)diol and poly(ε-caprolactone)diol; and polyether diols such as poly(tetramethylene ether)glycol, poly(propylene oxide)glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic diols such as ethylene glycol, 1,4-butanediol, 1,6-hexanediol and neopentyl glycol. One example of a thermoplastic polyurethane is characterized as essentially poly(adipic acid-co-butylene glycol-co-diphenylmethane diisocyanate).

In one particular embodiment, a thermoplastic polyurethane elastomer is used that contains carbonate groups. The thermoplastic polyurethane elastomer, for instance, may have at least one soft segment containing carbonate groups.

Thermoplastic elastomers containing carbonate groups can be produced, in one embodiment, using a diol component that contains carbonate groups. For instance, the thermoplastic elastomer can be produced as described above by reacting together a polymer diol containing carbonate groups with an isocyanate and a chain extender. The polymer diol, for instance, may comprise a polycarbonate diol and/or a polyester polycarbonate diol.

A polycarbonate diol may be produced by reacting a diol with a carbonate compound. The carbonate compound may comprise, for instance, a carbonate compound with alkyl groups, a carbonate compound with alkylene groups, or a carbonate compound containing aryl groups. Particular carbonate compounds include dimethyl carbonate, diethyl carbonate, ethylene carbonate, and/or diphenyl carbonate. A polyester polycarbonate, on the other hand, may be formed by reacting a diol with a carbonate compound as described above in the presence of a carboxylic acid.

As described above, the polycarbonate groups contained in the thermoplastic elastomer are generally referred to as soft segments. Thus, the polycarbonate groups have a tendency to lower the hardness of the thermoplastic elastomer. In one embodiment, for instance, the Shore A hardness of the thermoplastic elastomer is less than about 98, such as less than about 95, such as less than about 93 when tested according to ISO Test 868. The shore A hardness of the material is generally greater than about 80, such as greater than about 85.

The amount of thermoplastic elastomer contained in the polymer composition can vary depending upon various factors. In general, the thermoplastic elastomer is present in an amount greater than about 5% by weight, such as in an amount greater than about 10% by weight, such as in an amount greater than about 15% by weight, such as in an amount greater than about 20% by weight, such as in an amount greater than about 25% by weight. In general, the thermoplastic elastomer is present in amounts less than about 50% by weight, such as less than about 40% by weight, such as less than about 30% by weight.

In one embodiment, the thermoplastic elastomer may be coupled to the polyoxymethylene polymer of the present disclosure via the coupling agent as described above. The coupling agent can form bridging groups between the polyoxymethylene polymer and the thermoplastic elastomer. Further, the coupling agent may be capable of forming covalent bonds with the terminal hydroxyl groups on the polyoxymethylene polymer and with active hydrogen atoms on the thermoplastic elastomer. In this manner, the thermoplastic elastomer becomes coupled to the polyoxymethylene through covalent bonds.

When a thermoplastic elastomer is included in the composition of the present disclosure, the poloxymethylene polymer, thermoplastic elastomer, and coupling agent can be melt blended in an extruder, and then various loadings of texturizing agents, such as glass fibers, can be added.

In addition to a coupling agent, a texturizing agent, and an optional thermoplastic elastomer, the polymer composition of the present disclosure can also optionally contain a stabilizer and/or various other known additives. Such additives can include, for example, antioxidants, acid scavengers, UV stabilizers or heat stabilizers. In addition, the molding material or the molding may contain processing auxiliaries, for example adhesion promoters, lubricants, nucleating agents, demolding agents, fillers, reinforcing materials or antistatic agents and additives which impart a desired property to the molding material or to the molding.

For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g., 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyoxanilide and 2-ethoxy-4'-dodecyloxanilide; cyanoacrylates, e.g., ethyl-α-cyano-β,β-diphenylacrylate and methyl-2-cyano-3-methyl-3-(p-methoxyphenyl)acrylate, or mixtures thereof.

In one embodiment, the polymer composition may also include a formaldehyde scavenger, such as a nitrogen-containing compound. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

Further, the formaldehyde scavenger can be a guanidine compound which can include an aliphatic guanamine-based compound, an alicyclic guanamine-based compound, an aromatic guanamine-based compound, a hetero atom-containing guanamine-based compound, or the like. The formaldehyde scavenger can be present in the composition in an amount less than about 2% by weight, such as an amount from about 0.001% by weight to about 1.5% by weight, such as from about 0.01% by weight to about 1% by weight.

In one embodiment, the composition may also contain a nucleant. The nucleant, for instance, may increase crystallinity and may comprise an oxymethylene terpolymer. In one particular embodiment, for instance, the nucelant may comprise a terpolymer of butanediol diglycidyl ether, ethylene oxide, and trioxane. The nucleant can be present in the composition in an amount greater than about 0.05% by weight, such as greater than about 0.1% by weight. The nucleant may also be present in the composition in an amount less than about 2% by weight, such as in an amount less than about 1% by weight.

Still another additive that may be present in the composition is a sterically hindered phenol compound, which may serve as an antioxidant. Examples of such compounds, which are available commercially, are pentaerythrityl tetrakis[3-(3, 5-di-tert-butyl-4-hydroxyphenyl)propionate](IRGANOX® 1010, BASF), triethylene glycol bis[3-(3-tert-butyl-4-hydroxy-5-methylphenyl)propionate](IRGANOX® 245, BASF), 3,3'-bis[3-(3,5-di-tert-butyl-4-hydroxyphenyl)propionohydrazide](IRGANOX® MD 1024, BASF), hexamethylene glycol bis[3-(3,5-di-tert-butyl-4-hydroxyphenyl)propionate](IRGANOX® 259, BASF), and 3,5-di-tert-butyl-4-hydroxytoluene (LOWINOX® BHT, Chemtura). Preference is given to IRGANOX® 1010 and especially IRGANOX® 245. The above compounds may be present in the composition in an amount less than about 2% by weight, such as in an amount from about 0.01% to about 1% by weight.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be included in amounts greater than about 0.1% by weight, such as in amounts greater than about 0.5% by weight, but in an amount less than about 2% by weight, such as in an amount less than about 1% by weight.

In one embodiment, the composition may also contain one or more lubricants. The lubricant may comprise a polymer wax composition. Lubricants that may be included in the composition include, for instance, N,N'-ethylene bissteara-mide (EBS). In one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount from about 0.01% to about 5% by weight. For instance, a lubricant can be present in an amount greater than about 0.1% by weight, such as in an amount from about 0.1% to about 1% by weight. The above polyethylene glycol polymer can also be present in an amount up to about 5% by weight. For instance, the polyethylene glycol polymer can be present in an amount from about 0.1% to about 2% by weight, such as from about 0.5% to about 1% by weight.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount of from about 0.01% to about 1% by weight.

Any of the above additives can be added to the polymer composition alone or combined with other additives. In general, each additive is present in an amount less than about 5% by weight, such as in an amount less than about 2% by weight, such as in an amount less than about 1% by weight.

An almost limitless variety of polymer articles may be molded in accordance with the present disclosure. Such articles may include knobs, door handles, automotive panels, interior automotive parts such as bezels, consumer appliance parts, and the like without limitation.

Molded articles can be made according to the present disclosure using various different processes. In one embodiment, for instance, the molded articles can be formed through an injection molding process where molten polymer is injected into a heated mold. In an alternative embodiment, the articles may be formed through a blow molding process. Other embodiments include rotational molding and extrusion. Generally, the heated mold temperature for polyoxymethylene is less than about 125° C., such as from about 60° C. to about 120° C., such as from about 65° C. to about 110° C., such as from about 70° C. to about 100° C.

After the composition of the present disclosure is molded, the resulting molded article can receive a coating comprising an ink composition without having to pretreat the surface of the molded article. In this regard, the ink composition can be applied directly to the exterior surface of the molded article without having to first apply a primer coat or any type of pretreatment layer.

Applicants have found that when the mold temperature is less than about 120° C., plaques molded from the polymer composition of the present disclosure exhibit good printability as compared to those plaques molded at higher mold temperatures, such as at about 120° C. Without intending to be limited by theory, it is thought that the plaques molded at higher temperatures may have higher crystallinity at their surfaces, while the plaques molded at lower temperatures may have an amorphous layer at their surfaces, which can aid in the absorption of printing inks or other coatings, resulting in improved printability.

The present disclosure may be better understood with reference to the following examples.

EXAMPLES

The following tests were conducted in order to demonstrate some of the advantages and benefits of forming molded articles from polymer compositions made according to the present disclosure. Various polymer compositions were formulated and molded into plaques at different mold temperatures. The plaques had a length of 4", a width of 3", and a thickness of ⅛". Scanning electron micrographs (SEMs) were then taken of the surfaces of several of the plaques, as shown in FIGS. 1-4.

The plaques then underwent a pad printing process using ink compositions obtained commercially from ITW Trans Tech. The ink compositions were (A) type B pad printing ink, (B) type B/GL pad printing ink, (C) type PV pad printing ink, and (D) type R pad printing ink. In particular, each ink composition had a black color and was applied to the plaques so as to produce a print with a logo and solid square on the plaque having a length of 2 cm and a width of 1.5 cm. The printed plaques were then subjected to a cross-hatch tape test and a Taber test.

The following polymer compositions (Samples 1 through 7) were tested:

1. XGC25 polyoxymethylene molded into a plaque using a mold temperature of 70° C.
2. XGC25 polyoxymethylene molded into a plaque using a mold temperature of 90° C.
3. XGC25 polyoxymethylene molded into a plaque using a mold temperature of 110° C.
4. XGC25 polyoxymethylene molded into a plaque using a mold temperature of 120° C.
5. S9364 polyoxymethylene with 5% glass fibers molded into a plaque using a mold temperature of 80° C.
6. S9364 polyoxymethylene with 10% glass fibers molded into a plaque using a mold temperature of 80° C.
7. S9364 polyoxymethylene with 20% glass fibers molded into a plaque using a mold temperature of 80° C.

The XGC25 polyoxymethylene samples contained 73.69% polyoxymethylene flakes with terminal hydroxyl group content of about 30 mmol/kg, 25% glass fibers, 0.5% nucleant, 0.2% antioxidant, 0.11% melamine stabilizer, and 0.5% MDI coupling agent.

The S9364 polyoxymethylene samples contained 0.15% EBS wax, 0.25% antioxidant, 18% impact modifier (thermoplastic elastomer), 0.5% coupling agent, the stated amount of glass fibers in samples 5 through 7 above, and then an appropriate amount of polyoxymethylene flakes with terminal hydroxyl group content of about 30 mmol/kg to reach 100%. Thus, sample 5 contained 76.1% polyoxymethylene flakes, sample 6 contained 71.1% polyoxymethylene flakes, and sample 7 contained 61.1% polyoxymethylene flakes.

First, SEMs were taken of uncoated plaques molded from the compositions of samples 1 through 4 above, as shown in FIGS. 1 through 4. The SEMs were taken under high vacuum and at 2 kilovolts (kV). The SEMs in FIGS. 1 through 4 show subtle differences in the surface roughness among samples 1 through 4. FIG. 1, which corresponds with the plaque molded at 70° C. mold temperature, appears to have the roughest surface, as surface striations and exposed glass fibers are visible. Meanwhile, the plaque molded at 120° C. mold temperature appears to have the smoothest surface, with minimal surface texture and minimal glass fiber exposure.

Next, the surface measured was assessed quantitatively via a profilometer. The surface roughness is generally expressed as a measure of $R_a$, where $R_a$ is a measure of units of height calculated as follows:

$$R_a = \frac{1}{n}\sum_{i=1}^{n} |y_i|$$

where the roughness profile contains n ordered, equally spaced points along the trace, and $|y_i|$ is the vertical distance from the mean line to the $i^{th}$ data point. Height is assumed to be positive in the up direction, away from the bulk material. Samples 1 through 4, having a glass fiber content of about 25% by weight, had a surface roughness ranging from about 1.5 micrometers to about 2.0 micrometers, as characterized by the average of the height of the vertical deviations in the surface. Meanwhile, sample 5, having a glass fiber content of 5% by weight, had a surface roughness of about 0.7 micrometers. Sample 6, having a glass fiber content of 10% by weight, had a surface roughness of about 1.0 micrometers. Sample 7, having a glass fiber content of 20% by weight, had a surface roughness of about 1.2 micrometers. Thus, the samples having a higher glass fiber content showed increased surface roughness, which may contribute to the improved printability of the samples containing higher glass fiber content along with a reduced molding temperature, as discussed in more detail below.

Further, samples 1 through 7 above were coated with ink compositions A through D and subjected to the cross-hatch tape test discussed above, while samples 1 and 5 through 7 were subjected to the Taber test discussed above to determine the print retention of the polymers.

The following are results of the cross-hatch tape testing and Taber testing for the samples, where A through D refer to the ink composition applied to each of samples 1-7.

TABLE 1

| Sample | Mold Temperature (° C.) | Glass Fiber (%) | Cross Hatch Test (% of area removed) | Taber Test (Cycles to reach visual failure) |
|---|---|---|---|---|
| 1A | 70 | 25 | 1 | 125-150 |
| 1B | 70 | 25 | 5 | 125-150 |
| 1C | 70 | 25 | 1 | 125-150 |
| 1D | 70 | 25 | 5 | 125-150 |
| 2A | 90 | 25 | 10 | — |
| 2B | 90 | 25 | 10 | — |
| 2C | 90 | 25 | 10 | — |
| 2D | 90 | 25 | 10 | — |
| 3A | 110 | 25 | 35 | — |
| 3B | 110 | 25 | 35 | — |
| 3C | 110 | 25 | 35 | — |
| 3D | 110 | 25 | 35 | — |
| 4A | 120 | 25 | 35 | — |
| 4B | 120 | 25 | 35 | — |
| 4C | 120 | 25 | 35 | — |
| 4D | 120 | 25 | 35 | — |
| 5A | 80 | 5 | 5 | 25-50 |
| 5B | 80 | 5 | 5 | 50-75 |
| 5C | 80 | 5 | 5 | 50-75 |
| 5D | 80 | 5 | 5 | 50-75 |
| 6A | 80 | 10 | 5 | 50-75 |
| 6B | 80 | 10 | 5 | 50-75 |
| 6C | 80 | 10 | 5 | 50-75 |
| 6D | 80 | 10 | 5 | 50-75 |
| 7A | 80 | 20 | 5 | 150-175 |
| 7B | 80 | 20 | 5 | 75-100 |
| 7C | 80 | 20 | 5 | 175-200 |
| 7D | 80 | 20 | 5 | 75-100 |

More particularly, after being printed with the ink compositions, the plaques were tested according to the cross hatch tape pull test, which is described in ASTM D3359-09 Test Method B. The cross hatch test assessed the resistance of paint and ink coatings to separate from a substrate when a right-angle lattice pattern is cut into the coating, penetrating through the substrate. The results of the test are shown in the percentage of printed coating removed after completion of the test.

As shown in Table 1, when the polyoxymethylene and glass fiber compositions of sample 1 (mold temperature of 70° C.) and sample 2 (mold temperature of 90° C.) were subjected to the cross-hatch tape test, regardless of the ink composition applied (A through D), the % surface area of the ink composition that was removed was only from about 1% to about 10%. For example, the % surface area of the ink composition that was removed from sample 1 (mold temperature of 70° C.) was only from about 1% to about 5%. Meanwhile, when the polyoxymethylene and glass fiber compositions of sample 3 (mold temperature of 110° C.) and sample 4 (mold temperature of 120° C.) were subjected to the cross-hatch tape test, regardless of the ink composition applied (A through D), the % surface area of the ink composition that was removed was about 35%.

Further, a thermoplastic elastomer was combined with the poloxymethylene polymer of the present disclosure and either about 5% by weight (sample 5), 10% by weight (sample 6), or about 20% by weight (sample 7) of glass fibers were added. The resulting compositions were then molded into a plaque at a mold temperature of 80° C. and printed with ink compositions A through D. As shown in Table 1, regardless of the amount of glass fiber used in the polyoxymethylene/thermoplastic elastomer compositions of samples 5 through 7, the % surface area of the ink composition that was removed was only about 5%.

Figure 5:
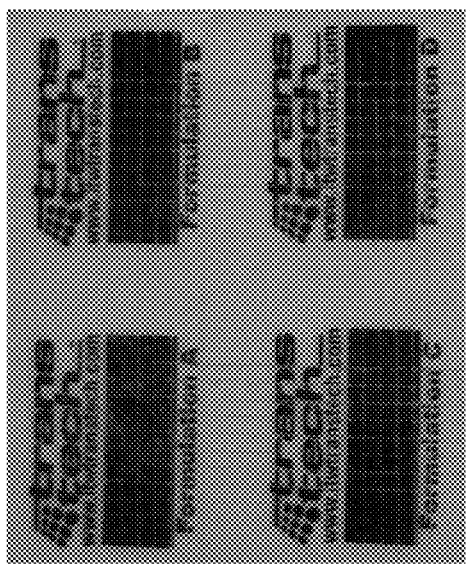
FIG. 5 shows the plaque of FIG. 1 after various ink coatings have been applied thereto.
Figure 6:
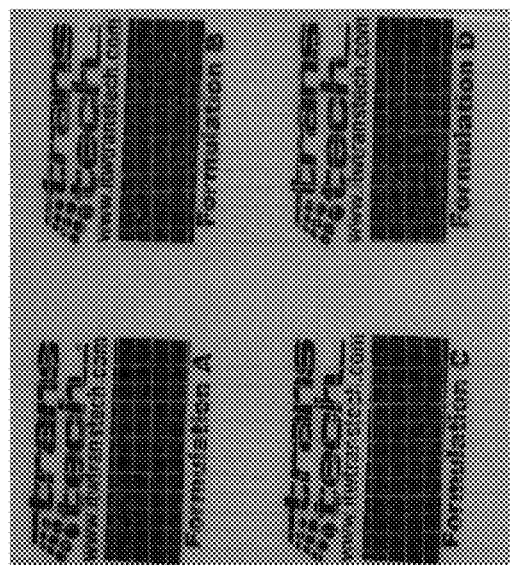
FIG. 6 shows the plaque of FIG. 2 after various ink coatings have been applied thereto.
Figure 7:
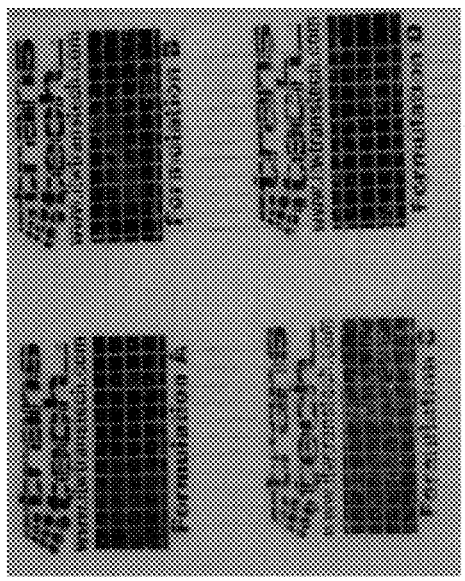
FIG. 7 shows the plaque of FIG. 3 after various ink coatings have been applied thereto.
Figure 8:
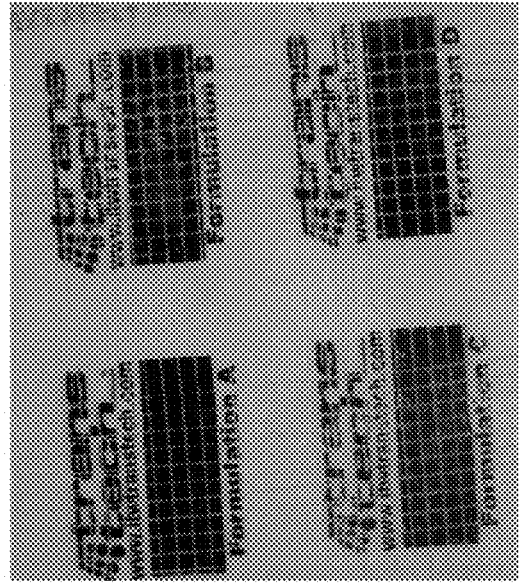
FIG. 8 shows the plaque of FIG. 4 after various ink coatings have been applied thereto.
Figure 9:
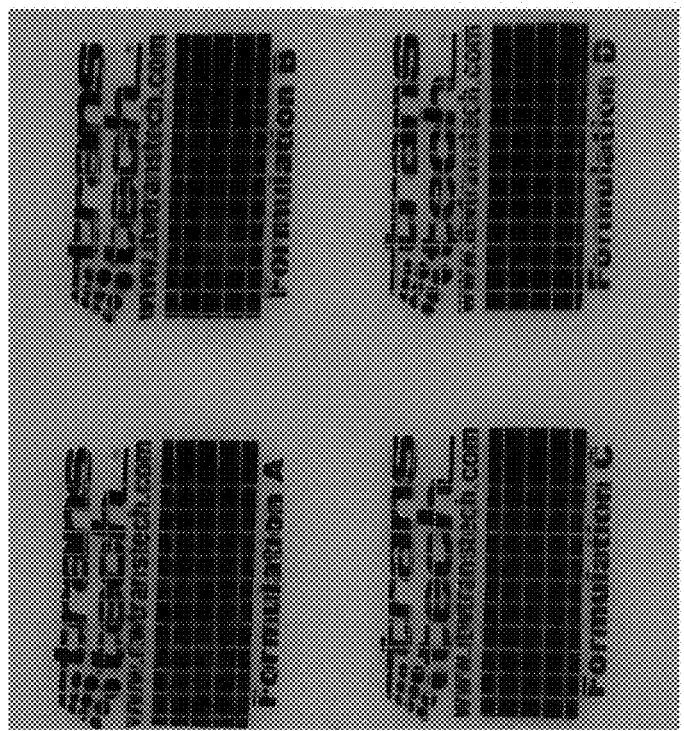
FIG. 9 shows a plaque molded from a polymer composition according to one embodiment of the present disclosure after various ink coatings have been applied thereto.

The ability of the ink compositions A through D to be retained on numerous polymer samples is demonstrated in FIGS. 5-9. FIGS. 5-8 show plaques formed from the polyoxymethylene/25% glass fiber compositions of samples 1 through 4 (molded at mold temperatures ranging from about 70° C. to about 120° C. as described above), while FIG. 9 shows a plaque formed from the impact modified polyoxymethylene/thermoplastic elastomer/10% glass fiber composition of sample 6 (mold temperature of about 80° C.). Specifically, FIG. 5 shows a plaque formed from the composition of sample 1 that has been coated with ink compositions A through D. Meanwhile, FIG. 6 shows a plaque formed from the composition of sample 2 after being coated with ink compositions A through D. Further, FIG. 7 shows a plaque formed from the composition of sample 3 after being coated with ink compositions A through D. FIG. 8 shows a plaque formed from the composition of sample 4 after being coated with ink compositions A through D. Lastly, FIG. 9 shows a plaque formed from the composition of sample 6 after being coated with ink compositions A through D. As seen from the figures, the plaques molded at lower mold temperatures (70° C. and 90° C.) retain a greater amount of the ink compositions A through D as compared to the plaques molded at higher mold temperatures (110° C. and 120° C.).

The samples were also tested according to the Taber test, using a Taber 5130 with CS-10 wheels and a 1 kilogram load. The test was performed in cycles, and the cycles were performed in blocks of 25. The number of cycles to visual failure was recorded. Visual failure is described as when the ink composition lost its integrity and was noticeably worn away from the molded plaque. As shown in Table 1 above, compositions having a higher glass fiber percentage by weight could undergo more cycles of testing before failure as compared to the compositions having a lower glass fiber percentage.

As seen from the SEMs and the testing data above, a higher molding temperature corresponds with a smoother surface upon which the printed coating is applied, and a higher molding temperature also corresponds to an increased percentage of printed coating being removed upon print retention testing.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A molded product comprising:
a molded article made from a polymer composition, wherein the molded article has an exterior surface and the polymer composition comprises a polyoxymethylene polymer having terminal groups, a coupling agent, and a texturizing agent blended with the polyoxymethylene polymer, wherein at least about 25% of the terminal groups are functional groups and wherein the texturizing agent comprises particles, fibers, or mixtures thereof; and
a coating applied to the exterior surface of the molded article, the coating comprising an ink composition, the coating being continuous or discontinuous over the surface of the molded article, wherein the coating is applied to the exterior surface of the molded article without subjecting the exterior surface to a pretreatment.

2. A molded product as defined in claim 1, wherein the functional groups are hydroxyl groups.

3. A molded product as defined in claim 1, wherein the coupling agent comprises an isocyanate.

4. A molded product as defined in claim 1, wherein the coupling agent is present in the composition in an amount ranging from about 0.1% by weight to about 10% by weight.

5. A molded product as defined in claim 1, wherein the texturizing agent comprises glass fibers.

6. A molded product as defined in claim 1, wherein the texturizing agent is present in the composition in an amount ranging from about 3% by weight to about 50% by weight.

7. A molded product as defined in claim 1, wherein a sizing agent is present on the texturizing agent.

8. A molded product as defined in claim 1, wherein the polymer composition further comprises a thermoplastic elastomer.

9. A molded product as defined in claim 8, wherein the thermoplastic elastomer comprises a thermoplastic polyurethane elastomer.

10. A molded product as defined in claim 8, wherein the thermoplastic elastomer is present in the polymer composition in an amount greater than about 10% by weight.

11. A molded product as defined in claim 8, wherein the thermoplastic elastomer comprises a thermoplastic polyurethane elastomer.

12. A molded product as defined in claim 8, wherein the thermoplastic elastomer comprises a thermoplastic polyurethane elastomer, the thermoplastic polyurethane elastomer being present in the polymer composition in an amount from about 5% to about 25% by weight, and wherein at least about 70% of the terminal groups of the polyoxymethylene polymer are functional groups, the polyoxymethylene polymer being present in the polymer composition in an amount of at least about 50% by weight.

13. A molded product as defined in claim 1, wherein the coating has been pad printed onto the exterior surface of the molded article.

14. A molded product as defined in claim 1, wherein the coating on the exterior surface of the molded article comprises printed matter, designs, or mixtures thereof.

15. A molded product as defined in claim 1, wherein the ink composition comprises a resin combined with at least one coloring agent.

16. A molded product as defined in claim 15, wherein the resin comprises a crosslinked polymer.

17. A molded product as defined in claim 15, wherein the resin comprises a polyvinyl alcohol, an epoxy, an acrylic, an acrylate, an acrylated urethane, a polyester, or a polyether.

18. A molded product as defined in claim 15, wherein the coloring agent comprises an organic or inorganic pigment.

19. A molded product as defined in claim 15, wherein the coloring agent comprises an organic or inorganic dye.

20. A molded product as defined in claim 1, wherein the molded product comprises a sporting good.

21. A molded product as defined in claim 1, wherein the molded product comprises a medical device.

22. A molded product as defined in claim 1, wherein the molded product comprises military gear.

23. A molded product as defined in claim 1, wherein the molded product comprises a buckle.

24. A molded product as defined in claim 23, wherein the buckle is printed with a camouflage pattern.

25. A molded product as defined in claim 1, wherein the coating is directly applied to the exterior surface of the molded article.

26. A molded product as defined in claim 1, wherein the molded article is molded at a mold temperature ranging from about 60° C. to about 120° C.

27. The molded product as defined in claim 1, wherein the coating is applied without a corona discharge, UV irradiation, or e-beam irradiation treatment of the exterior surface.

* * * * *